United States Patent
Pascu et al.

(10) Patent No.: US 9,279,386 B2
(45) Date of Patent: Mar. 8, 2016

(54) JET NOISE REDUCTION USING EDUCTION EFFECT

(75) Inventors: Victor Pascu, San Diego, CA (US); Anthony C. Jones, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1035 days.

(21) Appl. No.: 13/416,572

(22) Filed: Mar. 9, 2012

(65) Prior Publication Data
US 2013/0232981 A1 Sep. 12, 2013

(51) Int. Cl.
F02K 1/46 (2006.01)

(52) U.S. Cl.
CPC .......................... F02K 1/46 (2013.01)

(58) Field of Classification Search
CPC ............. F02K 1/46; F02K 1/386; F02K 1/34; F02K 1/28; F02K 1/827; F02C 7/045; F02C 7/24; F05D 2260/96
See application file for complete search history.

(56) References Cited

U.S. PATENT DOCUMENTS

| | | | | |
|---|---|---|---|---|
| 2,988,302 A * | 6/1961 | Smith | ............................... | 244/15 |
| 4,422,524 A * | 12/1983 | Osborn | ......................... | 181/215 |
| 5,265,408 A | 11/1993 | Sheoran et al. | | |
| 5,655,359 A | 8/1997 | Campbell et al. | | |
| 5,884,843 A * | 3/1999 | Lidstone et al. | ......... | 239/265.13 |
| 6,092,360 A | 7/2000 | Hoag et al. | | |
| 6,615,576 B2 | 9/2003 | Sheoran et al. | | |
| 6,695,094 B2 | 2/2004 | Moffat et al. | | |
| 7,540,142 B2 * | 6/2009 | Sheoran et al. | ............... | 60/39.83 |
| 7,578,369 B2 | 8/2009 | Francisco et al. | | |
| 2006/0043236 A1* | 3/2006 | Campbell et al. | ............. | 244/1 N |
| 2006/0059891 A1 | 3/2006 | Sheoran et al. | | |
| 2007/0214767 A1 | 9/2007 | Napier et al. | | |
| 2010/0068036 A1 | 3/2010 | Brill et al. | | |
| 2011/0271686 A1* | 11/2011 | Francisco | ............... | F01D 25/12 60/783 |

OTHER PUBLICATIONS

X. Qian, "Decreasing the M Value of the Valves to Reduce the Air Dynamic Noise in the Compressor", from International Compressor Engineering Conference, Paper 485 (1984) pp. 441-445.
R. Kratowicz, "Buoyancy and Bernoulli allow air lift pumps and eductors to move one fluid by using another", from PlantServices.com <http://www.plantservices.com/articles/2002/12.html?page=print> (2002) 5 pages.

* cited by examiner

*Primary Examiner* — Phutthiwat Wongwian
*Assistant Examiner* — Stefan Ibroni
(74) *Attorney, Agent, or Firm* — Kinney & Lange, P.A.

(57) ABSTRACT

An exhaust duct through which an exhaust gas jet from a gas turbine engine flows comprises a duct wall, an inlet, an outlet and an eductor. The inlet, through which the exhaust gas jet enters the exhaust duct, is positioned at an upstream end of the exhaust duct. The outlet, through which the exhaust gas jet exits the exhaust duct, is positioned at a downstream end of the exhaust duct. The eductor is positioned proximate the downstream end. In one embodiment, the eductor comprises a perforated wall segment of the duct wall through which ambient air from outside of the duct wall is permitted to enter the exhaust duct. In yet another embodiment, the eductor is diverging.

17 Claims, 2 Drawing Sheets

JET NOISE REDUCTION USING EDUCTION EFFECT

BACKGROUND

The present invention relates generally to gas turbine engine exhaust systems, and more particularly, to means and methods for reducing exhaust gas jet noise.

In gas turbine engines, fuel is combusted in a stream of compressed core air to accelerate a flow of gas. The accelerated gas is then used to drive one or more turbines. A first turbine typically drives a compressor for producing the high-energy gas. A second turbine may also be used to power an electrical generator, such as in an industrial gas turbine or an auxiliary power unit (APU). The second shaft may also be used to drive a turboprop or a turboshaft. The gas finally passes through of an exhaust nozzle. Upon leaving the exhaust nozzle, the gas mixes with quasi-steady ambient air surrounding the gas turbine engine thereby generating noise.

A primary source of jet engine noise is the shear region of the relatively high velocity exhausted gas stream mixing with the relatively low velocity ambient air stream. For example, in auxiliary power units, the relatively high velocity exhaust gas jet mixes with the surrounding ambient air velocity which, on ground, is approximately zero. The mixing of the different velocity streams produces a large amount of turbulence and associated noise. As is known from Lighthill's equation, sound power is proportional with the velocity gradient of the exhaust gas jet.

Efforts have been made to reduce the overall noise production of aircraft for various purposes including improving quality of life near airports. Noise produced at exhaust nozzles, including those of APUs, has long been known to be a major source of aircraft noise. Various attempts have been made to reduce exhaust gas noise, including the use of mixing tabs along the downstream perimeter of exhaust nozzles. The tabs produce smoother mixing of the high velocity exhaust gas stream and the low velocity air stream, thereby reducing shear flow noise. These systems, however, result in a pressure loss within the exhaust duct, which reduces overall engine efficiency. Therefore, it would be desirable to have an exhaust nozzle with improved noise reduction characteristics without sacrificing engine efficiency.

SUMMARY

The present invention is directed to an exhaust duct through which an exhaust gas jet from a gas turbine engine flows. The exhaust duct comprises a duct wall, an inlet, an outlet and an eductor. The inlet, through which the exhaust gas jet enters the exhaust duct, is positioned at an upstream end of the exhaust duct. The outlet, through which the exhaust gas jet exits the exhaust duct, is positioned at a downstream end of the exhaust duct. The eductor is positioned proximate the downstream end. In one embodiment, the eductor comprises a perforated wall segment of the duct wall through which ambient air from outside of the duct wall is permitted to enter the exhaust duct. In yet another embodiment, the eductor is diverging.

DETAILED DESCRIPTION

Figure 1:
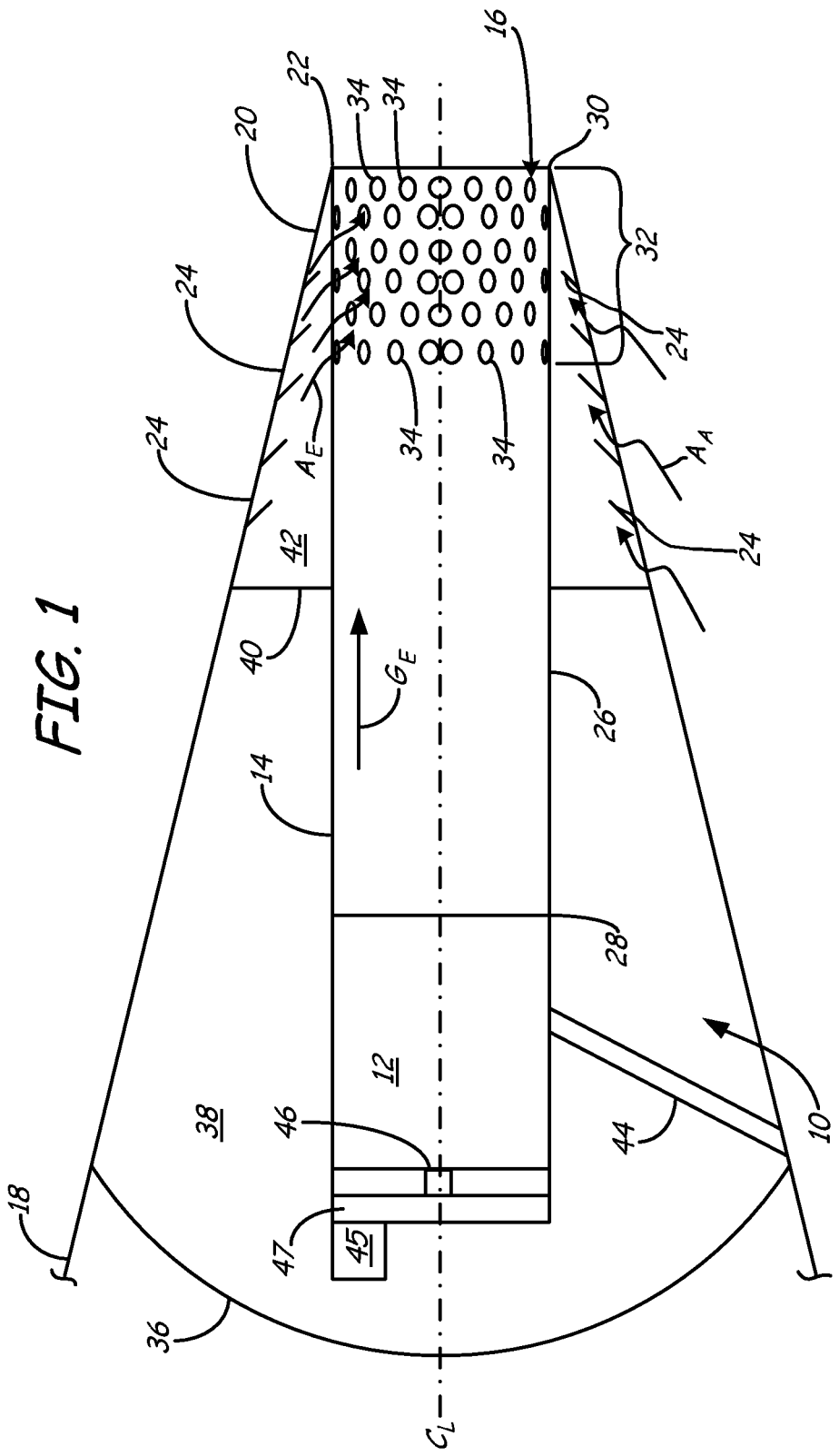
FIG. 1 is a schematic of an aircraft tail cone in which an auxiliary power unit is shown to include an exhaust duct having a noise-reducing eductor of the present invention.

FIG. 1 is a schematic of aircraft tail cone 10 in which auxiliary power unit (APU) 12 is shown to include exhaust duct 14 having noise-reducing eductor 16 of the present invention. Tail cone 10 comprises the aft-most portion of an aircraft fuselage and includes upstream portion 18 and downstream portion 20, which terminates in exit opening 22. Louvers 24 are disposed within downstream portion 20 near exit opening 22. Exhaust duct 14 comprises annular wall 26 having upstream end 28, downstream end 30 and eductor segment 32. Eductor 16 is positioned on eductor segment 32. Eductor segment 32 comprises a perforated portion of exhaust duct 14 such that eductor 16 comprises a plurality of openings 34. Dome wall 36 extends across tail cone 10 to form engine compartment 38. Barrier wall 40 extends from tail cone 10 to adjoin exhaust duct 14, thereby producing ingestion chamber 42. Exhaust duct 14 and tail cone 10 comprise annular bodies that extend along center line $C_L$. Tail cone 10 and exhaust duct 14 may have circular cross-sections such that they form a cone and a cylinder, respectively. However, tail cone 10 and exhaust duct 14 may have other non-uniform cross-sections.

APU 12 comprises a gas turbine engine. Although the invention is described with reference to an APU, the invention may be implemented in other types of gas turbine engines, such as industrial gas turbines and aircraft propulsion units. APU 12 and exhaust duct 14 are mounted within tail cone 10 by any suitable means as is known in the art. Upstream end 28 of exhaust duct 14 is coupled to APU 12 and extends such that downstream end 30 is concentric with exit opening 22. In the embodiment shown, exit opening 22 and downstream end 30 are coplanar and spaced from each other. In other embodiments, downstream end 30 contacts exit opening 22 or a seal is positioned between downstream end 30 and exit opening 22 to close-off ingestion chamber 42. Dome wall 36 segregates upstream portion 18 from downstream portion 20 and APU 12 contained therein. Tail cone 10 is provided with intake port 44 to permit ambient air AA to enter APU 12 such as through the operation of a retractable door. Louvers 24 permit eductor air AE to enter ingestion chamber 42. Barrier wall 40 separates APU 12 from the surrounding environment to protect against factors such as weather at to prevent migration of eductor air AE into engine compartment 38.

During operation, tail cone 10 is propelled through the atmosphere such that tail cone 10 has a velocity relative to ambient air $A_A$ during the flight of an aircraft. Also during operation, APU 12 combusts intake air and fuel to produce exhaust gas $G_E$, which is used to turn turbines that compress the intake air and that power electrical generator 45. In one embodiment, electrical generator 45 is driven by gas turbine engine 12 through shaft 46 and gear system 47. Electrical generator 45 supplies power to the aircraft. APU 12 may, however, be configured to provide input to other accessory systems, such as environmental control systems. Exhaust gas $G_E$ travels through exhaust duct 14 and enters ambient air $A_A$ at downstream end 30 traveling at speeds relatively higher than that of ambient air $A_A$. Ambient air $A_A$ is generally steady, or still, compared to the velocities of tail cone 10 and exhaust gas $G_E$. Exhaust gas $G_E$ leaves downstream end 30 with a velocity gradient determined by the configuration of exhaust duct 14. In a conventional exhaust duct, the velocity gradient is generally uniform from the center of the duct to near the duct wall where the velocity slightly decreases due to friction with annular wall 26. The drop off is moderate such that the difference between the velocity of ambient air $A_A$ and the velocity of exhaust gas $G_E$ remains sharp. The interaction of the high-velocity exhaust gas $G_E$ at annular wall 26 and the low-velocity ambient air $A_A$ produces noise as the streams mix and join together. The present invention further slows or decelerates the velocity of exhaust gas $G_E$ near annular wall 26 such that the velocity gradient is smoothed. With eductor 16 of the present invention, the velocity of exhaust gas $G_E$ gently decreases from the center of duct 14 toward annular wall 26 such that the difference between the velocities of exhaust gas $G_E$ and ambient air is less dramatic, thereby reducing noise.

In the present invention, eductor 16 introduces a steam of eductor air $A_E$ into exhaust duct 14 at eductor segment 32. Ingestion chamber 42 is provided with air via louvers 24. Eductor air $A_E$ is ingested, or pulled into, eductor segment 32 via eduction effect. Specifically, the static pressure of exhaust gas $G_E$ drops as it moves along exhaust duct 14, as determined by Bernoulli's equation, thus producing a space where viscous ambient air $A_A$ can enter duct 14 through eductor segment 32. Eduction effect is more effective at slower velocities of exhaust gas $G_E$. The invention is most-readily suitable for use in gas turbine engines that produce exhaust gas jets having velocities at or below Mach 1, such as typically occurs in auxiliary power units. Louvers 24 are sized and shaped to reduce interference with the eduction effect, and to prevent the formation of turbulence along tail cone 10. For example, louvers 24 are aerodynamically shaped outside of exhaust duct 14, and may be angled to direct ambient air $A_A$ in the downstream direction toward openings 34 inside exhaust duct 14. Louvers 24 provide sufficient ambient air $A_A$ to ingestion chamber 42 such that ingestion through openings 34 is uninhibited. In the embodiment shown, eductor segment 32 includes openings 34. In the embodiment shown, openings 34 are arranged in a plurality of offset rows of circular holes. That is, each row of openings 34 comprises a ring of equally spaced holes that are positioned between openings of the next downstream row of openings 34, each row being equally spaced. However, the specific configuration of eductor 16 can vary based on engine parameters and manufacturing considerations.

Figure 2:
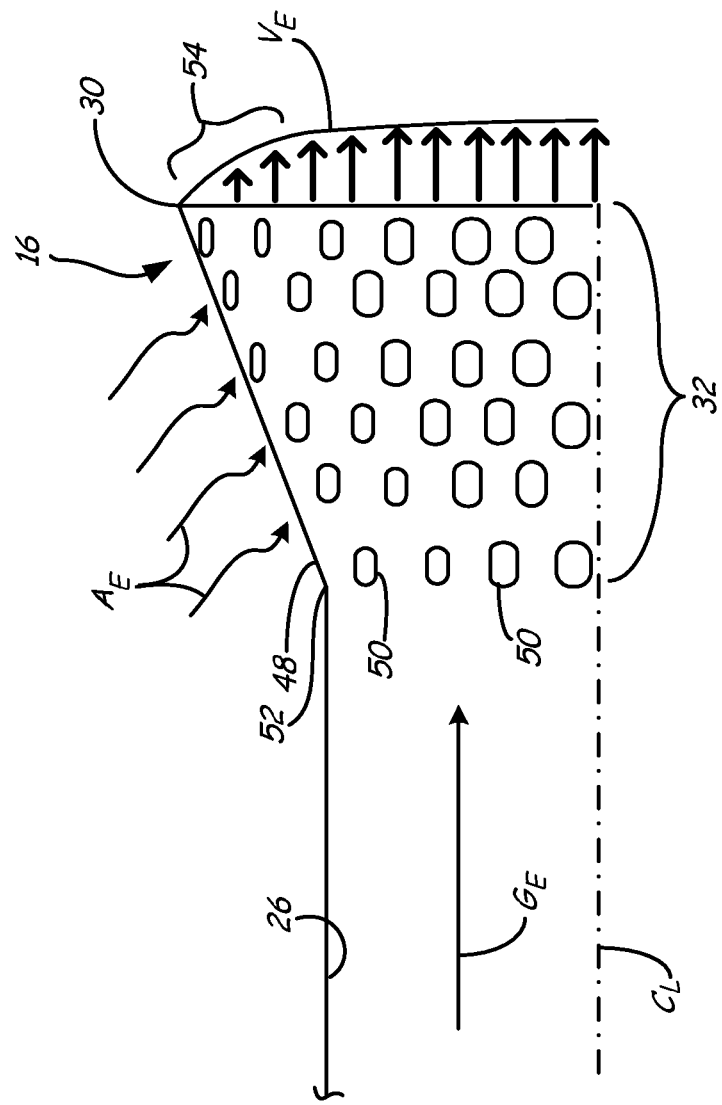
FIG. 2 is a schematic of an alternative embodiment of the exhaust duct of FIG. 1 in which the eductor is positioned along a diverging segment of the exhaust duct.

FIG. 2 is a schematic of an alternative embodiment of exhaust duct 14 of FIG. 1 in which eductor 16 is positioned along diverging segment 48 of exhaust duct 14. Diverging segment 48 encompasses eductor segment 32 of annular wall 26 and includes openings 50. In the embodiment shown, annular wall 26 extends from upstream end 28 (FIG. 1) to bend 52 in a generally axial direction around centerline $C_L$. At bend 52, annular wall 26 flares outward to continuously increase the cross-sectional area of exhaust duct 14 in the downstream direction up to downstream end 30. As shown, diverging segment 48 comprises a straight wall so as to form a diverging cone. However, other embodiments are possible, such as an arcuate diverging section (e.g. parabolic) or a multi-segmented diverging section (e.g. diverging, axial, diverging). Diverging segment 48 assists in reducing velocity gradient $V_E$ of exhaust gas $G_E$ at annular wall 26. Specifically, diverging segment 48 produces a static pressure drop of exhaust gas $G_E$ in exhaust duct 14 cumulative with the pressure drop produced by openings 50. As such, additional eductor air $A_E$ is permitted to mix with exhaust gas $G_E$ near annular wall 26 to smooth velocity profile $V_E$ and reduce noise when merging with ambient air $A_A$. Eductor air $A_E$ thus comprises noise-quenching air that decelerates exhaust gas $G_E$ near annular wall 26 to reduce direct interaction of gas and air streams with widely different velocities. In the embodiment shown, openings 50 encompass the entire length of diverging segment 48, but can be provided on a smaller length, such as a middle portion or an aft portion.

In the embodiment of FIG. 2, openings 50 comprise elliptical holes arranged in offset rows. The specific number of holes, the shape of each hole, and their placement on exhaust duct 14 (FIG. 1) are determined based on specific engine parameters. Computational Fluid Dynamics (CFD) software programs can be used to aid in configuring openings 34 (FIG. 1) and openings 50. In various other embodiments, openings 50 may comprise rectilinear slots. In yet other embodiments, openings 50 can be arranged in other patterns, such as in rows having increasing or decreasing axial spacing between rows as the rows progress in the downstream direction, or rows having holes that are circumferentially aligned with previous and subsequent rows. In other embodiments, eductor segment 32 may comprise many small pin hole-sized punctures through annular wall 26. In still other embodiments eductor segment 32 may comprise a wire mesh. In any embodiment, the total opening size, or cross-sectional area, of openings 34 (FIG. 1) or openings 50 is selected to permit quantities of eductor air $A_E$ into exhaust duct 14 (FIG. 1) to smooth shear region 54 of velocity gradient $V_E$ near annular wall 26 (FIG. 1).

The present invention is well suited for quenching noise in gas turbine engines having exhaust gas jet exit velocities that are sub-sonic, particularly below Mach 0.5. For example, turbojet engines, turbofan engines and auxiliary power units typically have exhaust gas jet velocities of approximately 0.3 or below. In gas turbine engine that are used as direct propulsors for aircraft, such as low-bypass ratio turbofans, exhaust gas jet velocities are generally above Mach 0.5, typically at about Mach 0.8. The exhaust duct eductor of the present invention in particularly apt at mixing exhaust gas jet with ambient air when the exhaust gas jet is traveling at about Mach 0.5 or below. At such speeds, adequate ambient air is able to be sucked into the eduction holes to effectively reduce the velocity profile of the exhaust gas jet near the exhaust duct.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An exhaust duct through which an exhaust gas jet from a gas turbine engine flows, the exhaust duct comprising:
   a duct wall, the duct wall comprising:
      an inlet at an upstream end of the duct wall through which the exhaust gas jet enters the exhaust duct; and
      an outlet at a downstream end of the duct wall through which the exhaust gas jet exits the exhaust duct;
   an outer wall circumscribing the duct wall;
   a barrier wall extending radially from the duct wall to the outer wall to isolate an engine compartment from an ingestion chamber, wherein a portion of the outer wall bounding the ingestion chamber has a plurality of apertures that place the ingestion chamber in communication with an ambient environment; and an eductor positioned proximate the downstream end, the eductor comprising:
    a perforated wall segment through which ambient air from the ingestion chamber is permitted to enter the exhaust duct.

2. The exhaust duct of claim 1 wherein the perforated wall segment comprises multiple rows of openings in the duct wall.

3. The exhaust duct of claim 1 wherein the perforated wall segment comprises perforations having a total cross-sectional area of sufficient size to permit ambient air to be ingested to smooth a velocity gradient of the exhaust gas jet at the duct wall.

4. The exhaust duct of claim 1 wherein the eductor is diverging.

5. An aircraft including the exhaust duct of claim 1 and further comprising:
    an auxiliary power unit coupled to the upstream end of the duct wall;
    wherein the outer wall forms a tail cone of an aircraft fuselage, the tail cone comprising:
        an upstream portion; and
        a downstream portion extending from the upstream portion and converging at an exit opening; and
    wherein the tail cone circumscribes the auxiliary power unit and the exhaust duct.

6. The aircraft of claim 5 and further comprising louvers positioned in the downstream portion of the tail cone that direct flow into the ingestion chamber.

7. The aircraft of claim 6 and further comprising:
    a dome wall enclosing the auxiliary power unit and the exhaust duct in the downstream portion of the tail cone;
    wherein the barrier wall extends radially from the duct wall to the downstream portion of the tail cone and positioned axially between the upstream end and the louvers.

8. A system comprising:
    an aircraft fuselage tail cone including a converging wall section extending from an upstream portion to a downstream exit opening;
    an auxiliary power unit disposed within an engine compartment of the converging wall section, the auxiliary power unit configured to produce a jet of exhaust gas;
    an exhaust duct extending from the auxiliary power unit to the downstream exit opening to guide the jet of exhaust gas out of the tail cone;
    a barrier wall extending between the exhaust duct and the aircraft fuselage tail cone to isolate the engine compartment from an ingestion chamber, wherein the converging wall section has a plurality of apertures placing the ingestion chamber in communication with an ambient environment; and
    an eductor for reducing a velocity gradient of the jet of exhaust gas along the exhaust duct at the exit opening, wherein the eductor places the ingestion chamber in communication with the exhaust duct.

9. The auxiliary power unit system of claim 8 wherein the eductor comprises a perforated segment of the exhaust duct including a plurality of offset rows of circular openings.

10. The auxiliary power unit system of claim 8 wherein the exhaust duct is diverging at a location of the eductor.

11. The auxiliary power unit system of claim 8 wherein the aircraft fuselage tail cone further comprises louvers positioned in the apertures of the converging wall section.

12. The auxiliary power unit system of claim 11 wherein the aircraft fuselage tail cone further comprises:
    a dome wall segregating the auxiliary power unit and the exhaust duct from the upstream portion of the tail cone;
    wherein the barrier wall surrounds the exhaust duct and is disposed axially between the auxiliary power unit and the louvers.

13. A method for reducing jet noise produced by a gas turbine engine, the method comprising:
    generating a jet of exhaust gas with a gas turbine engine enclosed within an engine compartment;
    passing the jet of exhaust gas through an exhaust duct having an exit;
    admitting ambient air into an ingestion chamber through a plurality of louvers in a tail cone surrounding the exhaust duct to produce noise-quenching air, wherein the ingestion chamber is at least partially defined by a barrier wall extending between the exhaust duct and the tail cone, and wherein the ingestion chamber is fluidly isolated from the engine compartment;
    educting the noise-quenching air into the exhaust duct proximate the exit to decelerate a portion of the jet of exhaust gas near the exhaust duct; and
    passing the jet of exhaust gas and the noise-quenching air out of the exhaust duct into ambient air surrounding the gas turbine engine.

14. The method of claim 13 and further comprising:
    mixing the noise quenching air with the jet of exhaust gas to change a velocity profile of the jet of exhaust gas near the exhaust duct.

15. The method of claim 13 wherein educting the noise-quenching air into the exhaust duct comprises:
    passing ambient air into the exhaust duct through a perforated segment of the exhaust duct.

16. The method of claim 15 wherein the perforated wall segment comprises multiple offset rows of circular holes through the exhaust duct that are positioned proximate the exit.

17. The method of claim 13 and further comprising:
    expanding the jet of exhaust gas and the noise-quenching air within the exhaust duct by passing the jet of exhaust gas and the noise-quenching air through a diverging section of the exhaust duct.

* * * * *